(12) United States Patent
Chiu et al.

(10) Patent No.: US 11,916,487 B2
(45) Date of Patent: Feb. 27, 2024

(54) ASYMMETRIC HALF-BRIDGE CONVERTER

(71) Applicant: Power Forest Technology Corporation, Hsinchu County (TW)

(72) Inventors: Chao-Chang Chiu, Hsinchu County (TW); Kuan-Chun Fang, Tainan (TW); Yueh-Chang Chen, Hsinchu (TW); Tzu-Chi Huang, Hsinchu County (TW); Che-Hao Meng, Hsinchu (TW)

(73) Assignee: Power Forest Technology Corporation, Hsinchu County (TW)

( * ) Notice: Subject to any disclaimer, the term of this patent is extended or adjusted under 35 U.S.C. 154(b) by 210 days.

(21) Appl. No.: 17/702,813

(22) Filed: Mar. 24, 2022

(65) Prior Publication Data

US 2023/0261580 A1 Aug. 17, 2023

(30) Foreign Application Priority Data

Feb. 16, 2022 (TW) .................................. 111105523

(51) Int. Cl.
*H02M 3/335* (2006.01)
*H02M 1/00* (2006.01)

(52) U.S. Cl.
CPC ..... *H02M 3/33569* (2013.01); *H02M 1/0009* (2021.05)

(58) Field of Classification Search
CPC .......... H02M 3/33569; H02M 1/0009; H02M 1/0032; H02M 3/33571; H02M 1/0058
See application file for complete search history.

(56) References Cited

U.S. PATENT DOCUMENTS 9,119,274 B2 * 8/2015 Pawellek .............. H02M 1/425
10,170,974 B1 * 1/2019 Oh ......................... H02M 1/32

* cited by examiner

*Primary Examiner* — Adolf D Berhane
*Assistant Examiner* — Afework S Demisse
(74) *Attorney, Agent, or Firm* — JCIPRNET

(57) ABSTRACT

An asymmetric half-bridge converter is provided. The asymmetric half-bridge converter includes a switch circuit, a resonance tank, a current sensor, and a controller. The current sensor senses a waveform of a resonance current flowing through the resonance tank to generate a sensing result. The controller determines the sensing result. When the sensing result indicates that an ending current value of a primary resonance waveform of the resonance current is greater than a predetermined value, the controller performs a first switching operation on the switch circuit. When the sensing result indicates that the ending current value of the primary resonance waveform is less than or equal to the predetermined value, the controller performs a second switching operation on the switch circuit.

12 Claims, 6 Drawing Sheets

ASYMMETRIC HALF-BRIDGE CONVERTER

CROSS-REFERENCE TO RELATED APPLICATION

This application claims the priority benefit of Taiwan application serial no. 111105523, filed on Feb. 16, 2022. The entirety of the above-mentioned patent application is hereby incorporated by reference herein and made a part of this specification.

BACKGROUND

Technical Field

The disclosure relates to a power converter, and in particular, to an asymmetric half-bridge converter.

Description of Related Art

An asymmetrical half-bridge (AHB) converter provides favorable power conversion efficiency in a conventional AC-DC conversion structure. However, to maintain the same operation, the conversion efficiency of the AHB converter may be affected under different load conditions. Therefore, how to provide the suitable operation of the AHB converter under different load conditions is a research focus for those skilled in the art.

SUMMARY

The disclosure is directed to an asymmetric half-bridge converter capable of providing a suitable operation under different load conditions.

An asymmetric half-bridge converter of the disclosure includes a switch circuit, a resonance tank, a current sensor, and a controller. The switch circuit includes an upper arm switch and a lower arm switch. The upper arm switch and the lower arm switch are connected to a connection node. The resonance tank is coupled between the connection node and a ground end. The current sensor is coupled to the resonance tank. The current sensor senses a waveform of a resonance current flowing through the resonance tank to generate a sensing result. The waveform of the resonance current responds to a load condition. The controller is coupled to the resonance tank and the switch circuit. The controller determines the sensing result. When the sensing result indicates that an ending current value of a primary resonance waveform of the resonance current is greater than a predetermined value, the controller performs a first switching operation on the switch circuit. When the sensing result indicates that the ending current value of the primary resonance waveform is less than or equal to the predetermined value, the controller performs a second switching operation on the switch circuit.

Based on the above, the current sensor senses the waveform of the resonance current flowing through the resonance tank to generate the sensing result. When the sensing result indicates that the ending current value of the primary resonance waveform of the resonance current is greater than the predetermined value, the controller performs the first switching operation on the switch circuit. When the sensing result indicates that the ending current value of the primary resonance waveform is less than or equal to the predetermined value, the controller performs the second switching operation on the switch circuit. As a result, the asymmetric half-bridge converter of the disclosure may perform a switching operation corresponding to the waveform according to the waveform of the resonance current. In this way, the asymmetric half-bridge converter may automatically and instantly adopt the corresponding suitable operation under the different load conditions.

In order to make the aforementioned features and advantages of the disclosure comprehensible, embodiments accompanied with drawings are described in detail below.

DESCRIPTION OF THE EMBODIMENTS

Figure 1:
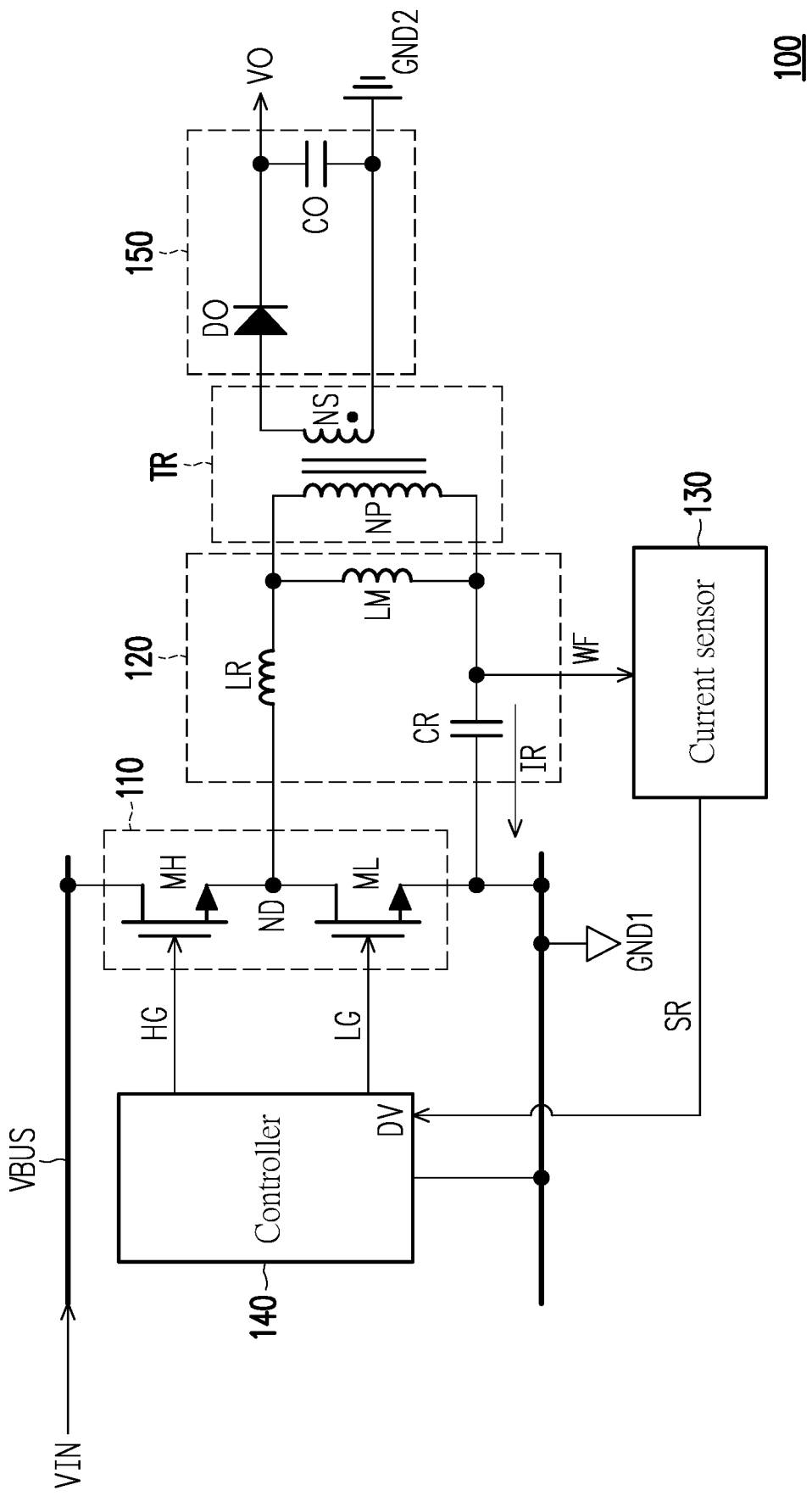
FIG. 1 is a schematic diagram of an asymmetric half-bridge (AHB) converter according to a first embodiment of the disclosure.

Some embodiments of the disclosure accompanied with the drawings will now be described in detail. In the reference numerals recited in description below, the same reference numerals shown in different drawings will be regarded as the same or similar elements. These embodiments are only a part of the disclosure and do not disclose all possible implementations of the disclosure. To be more precise, these embodiments are only examples of the appended claims of the disclosure.

Referring to FIG. 1, FIG. 1 is a schematic diagram of an asymmetric half-bridge (AHB) converter according to a first embodiment of the disclosure. In the embodiment, an AHB converter 100 includes a switch circuit 110, a resonance tank 120, a current sensor 130, and a controller 140. The switch circuit 110 includes an upper arm switch MH and a lower arm switch ML. The upper arm switch MH and the lower arm switch ML are connected to a connection node ND. For example, in the embodiment, a first end of the upper arm switch MH is configured to receive an input power VIN through a power transmission line VBUS. A second end of the upper arm switch MH is coupled to the connection node ND. A control end of the upper arm switch MH is coupled to the controller 140 to receive a control signal HG. The upper arm switch MH is turned on or turned off in response to the control signal HG. A first end of the lower arm switch ML is coupled to the connection node ND. A second end of the lower arm switch ML is coupled to a ground end GND1. A control end of the lower arm switch ML is coupled to the controller 140 to receive a control signal LG. The lower arm switch ML is turned on or turned off in response to the control signal LG.

In the embodiment, the resonance tank 120 is coupled between the connection node ND and the ground end GND1. The current sensor 130 is coupled to the resonance tank 120. The current sensor 130 senses a waveform WF of a resonance current IR flowing through the resonance tank 120. The current sensor 130 generates a sensing result SR based on the waveform WF of the resonance current IR. The waveform WF of the resonance current IR responds to a current load condition.

In the embodiment, the controller 140 is coupled to the resonance tank 120 and the switch circuit 110. The controller 140 may determine the sensing result SR. The controller 140 may perform a switching operation corresponding to the waveform WF of the resonance current IR on the switch circuit 110 based on the waveform WF of the resonance current IR. When the sensing result SR indicates that an ending current value of the primary resonance waveform WF of the resonance current IR is greater than a predetermined value DV, the controller 140 performs a first switching operation on the switch circuit 110. When the sensing result SR indicates that the ending current value of the primary resonance waveform WF is less than or equal to the predetermined value DV, the controller 140 performs a second switching operation on the switch circuit 110. In the embodiment, the first switching operation and the second switching operation respectively correspond to different load modes.

It is worth noting that the AHB converter 100 may perform the switching operation corresponding to the waveform WF according to the waveform WF of the resonance current IR. In this way, the AHB converter 100 may automatically and instantly adopt the corresponding suitable operation under different load conditions.

Figure 2A:
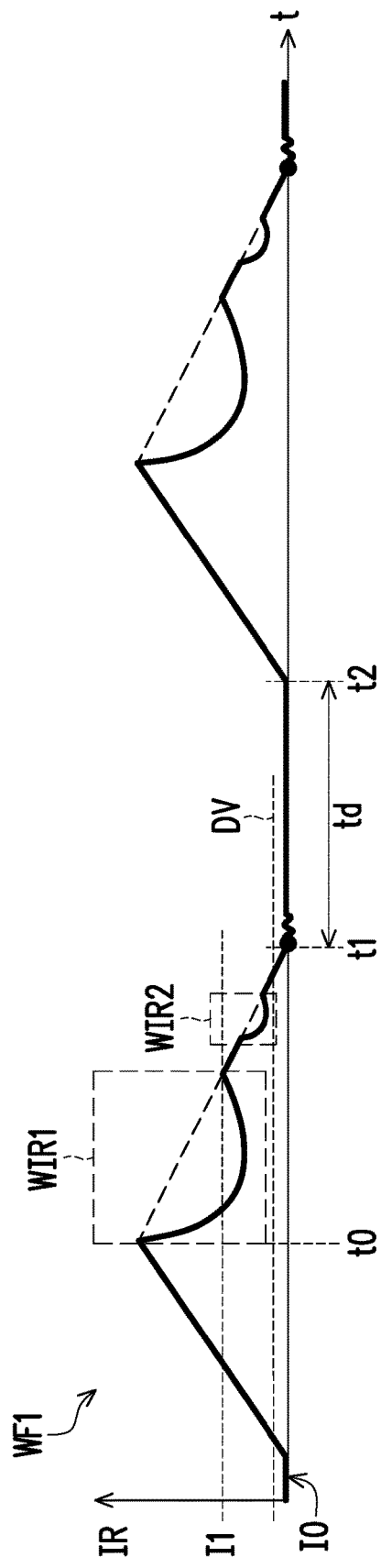
FIG. 2A is a first waveform diagram of a resonance current according to an embodiment of the disclosure.

The implementation details of the first switching operation are described with examples. Referring to FIG. 1 and FIG. 2A together, FIG. 2A is a first waveform diagram of a resonance current according to an embodiment of the disclosure. In the embodiment, the current sensor 130 senses a waveform WF1 of the resonance current IR flowing through the resonance tank 120 to generate the sensing result SR. At a time point t0, the upper arm switch MH is turned off, and the lower arm switch ML is turned on. A time period between the time point t0 and a time point t1 is a period when the lower arm switch ML is turned on. In the embodiment, a primary resonance waveform WIR1 is a first resonance undulation of the resonance current IR in the period when the lower arm switch ML is turned on. The primary resonance waveform WIR1 ends at an ending current value I1. The controller 140 may determine the waveform WF1. When it is determined that the ending current value I1 of the primary resonance waveform WIR1 is greater than the predetermined value DV, it means that the AHB converter 100 is currently applied under a relatively light load condition. As a result, the controller 140 performs the first switching operation on the switch circuit 110 so that the AHB converter 100 is applied in a light load state.

For example, the predetermined value DV is set to be 0.1 amperes. When it is determined that the ending current value I1 of the primary resonance waveform WIR1 is greater than 0.1 amperes, the controller 140 performs the first switching operation on the switch circuit 110 so that the AHB converter 100 is applied in the light load state.

In the first switching operation, the controller 140 controls a current value of the resonance current IR to be approximately 0 (i.e. the current value is I0) at the time point t1 when the lower arm switch ML is turned off. The controller 140 turns on the upper arm switch MH at a time point t2. The time point t2 is behind the time point t1 by a predetermined length of time td. In this way, during the period of the predetermined length of time td, the current value of the resonance current IR is controlled to be approximately 0. Hence, the AHB converter 100 enters a burst mode. In the burst mode, power consumption of the AHB converter 100 may be reduced.

In the embodiment, the waveform WF1 of the resonance current IR may be differentiated to obtain a change in the slope of the resonance current IR. As time elapses, when the sensing result SR indicates that a first decreasing negative slope appears on the resonance current IR and a positive slope subsequently appears, it is determined that the primary resonance waveform WIR1 of the resonance current IR appears. Hence, the controller 140 may determine the time when the primary resonance waveform WIR1 of the resonance current IR appears based on the change in the slope of the resonance current IR. In addition, a current value when the positive slope turns into the negative slope is the ending current value I1. That is, the controller 140 may further determine an ending time point of the primary resonance waveform WIR1 based on the change in the slope of the resonance current IR and obtain the ending current value I1 based on the current value at the ending time point of the primary resonance waveform WIR1.

In the embodiment, the controller 140 may further perform auxiliary determination according to a secondary resonance waveform WIR2 following the primary resonance waveform WIR1. When the sensing result SR indicates that the secondary resonance waveform WIR2 appears after the primary resonance waveform WIR1 of the resonance current IR ends, the controller 140 performs the first switching operation on the switch circuit 110. In the embodiment, the controller 140 may determine whether the secondary resonance waveform WIR2 of the waveform WF1 of the resonance current IR appears by using a slope change of a second decreasing negative slope and a subsequent positive slope.

Figure 2B:
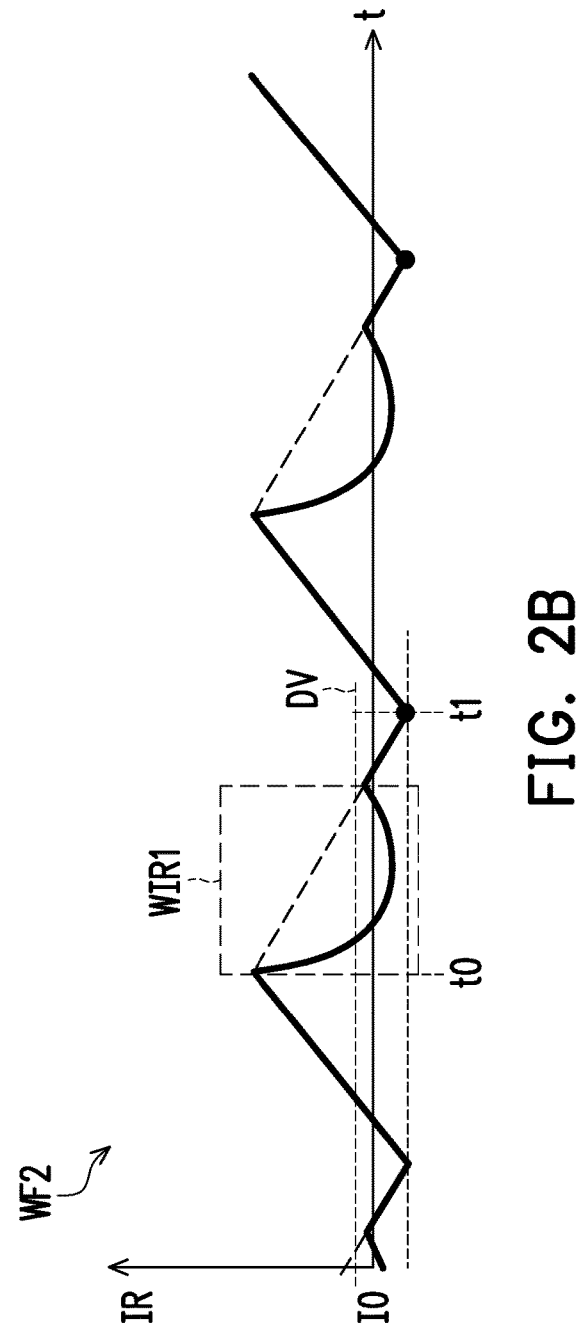
FIG. 2B is a second waveform diagram of a resonance current according to an embodiment of the disclosure.

The implementation details of the second switching operation are described with examples. Referring to FIG. 1 and FIG. 2B together, FIG. 2B is a second waveform diagram of a resonance current according to an embodiment of the disclosure. In the embodiment, the current sensor 130 senses a waveform WF2 of the resonance current IR flowing through the resonance tank 120 to generate the sensing result SR. The primary resonance waveform WIR1 is the first resonance undulation of the resonance current IR in the period when the lower arm switch ML is turned on. The primary resonance waveform WIR1 ends at an ending current value. The controller 140 may determine the waveform WF2. When it is determined that the ending current value of the primary resonance waveform WIR1 is less than or equal to the predetermined value DV, it means that the AHB converter 100 is currently applied under a relatively heavy load condition. As a result, the controller 140 performs a second switching operation on the switch circuit 110 so that the AHB converter 100 is applied in a heavy load state.

For example, the predetermined value DV is set to be 0.1 amperes. When it is determined that the ending current value of the primary resonance waveform WIR1 is less than or equal to the predetermined value, the controller 140 performs the second switching operation on the switch circuit 110 so that the AHB converter 100 is applied in the heavy load state.

In the second switching operation, the controller controls the current value of the resonance current IR to be a negative current value at the time point t1 when the lower arm switch ML is turned off and instantly turns on the upper arm switch MH at the time point t1 when the lower arm switch is turned off. Hence, the AHB converter 100 enters a continuous mode or a boundary mode. Compared to the burst mode, the output power may be increased in the continuous mode.

It is worth noting that in the second switching operation, the current value of the resonance current IR is controlled to be the negative current value at the time point t1. The negative current value may cause the AHB converter 100 to perform zero voltage switching (ZVS) so that the conversion efficiency of the continuous mode is enhanced.

In the embodiment, the controller 140 may further perform auxiliary determination according to a secondary resonance waveform following the primary resonance waveform WIR1. When the sensing result SR indicates that the secondary resonance waveform of the resonance current IR does not appear, the controller 140 performs the second switching operation on the switch circuit 110.

Returning to the embodiment of FIG. 1, in the embodiment, the resonance tank 120 includes a resonance inductor LR, a magnetizing inductor LM, and a resonance capacitor CR. The resonance inductor LR, the magnetizing inductor LM, and the resonance capacitor CR are coupled to each other in series. For example, in the embodiment, a first end of the resonance inductor LR is coupled to the connection node ND. A first end of the magnetizing inductor LM is coupled to a second end of the resonance inductor LR. A first end of the resonance capacitor CR is coupled to a second end of the magnetizing inductor LM. A second end of the resonance capacitor CR is coupled to the ground end GND1. The AHB converter 100 further includes a transformer TR and an output circuit 150. The transformer TR includes a primary side winding NP and a secondary side winding NS. The primary side winding NP is coupled in parallel to the magnetizing inductor LM. The secondary side winding NS is coupled to the output circuit 150. The output circuit 150 includes an output diode DO and an output capacitor CO; however, the disclosure is not limited thereto. A first end of the secondary side winding NS is coupled to an anode of the output diode DO. A second end of the secondary side winding NS is coupled to a ground end GND2. A cathode of the output diode DO serves as an output end configured to provide an output power VO. The output capacitor CO is coupled between the cathode of the output diode DO and the ground end GND2.

Figure 3:
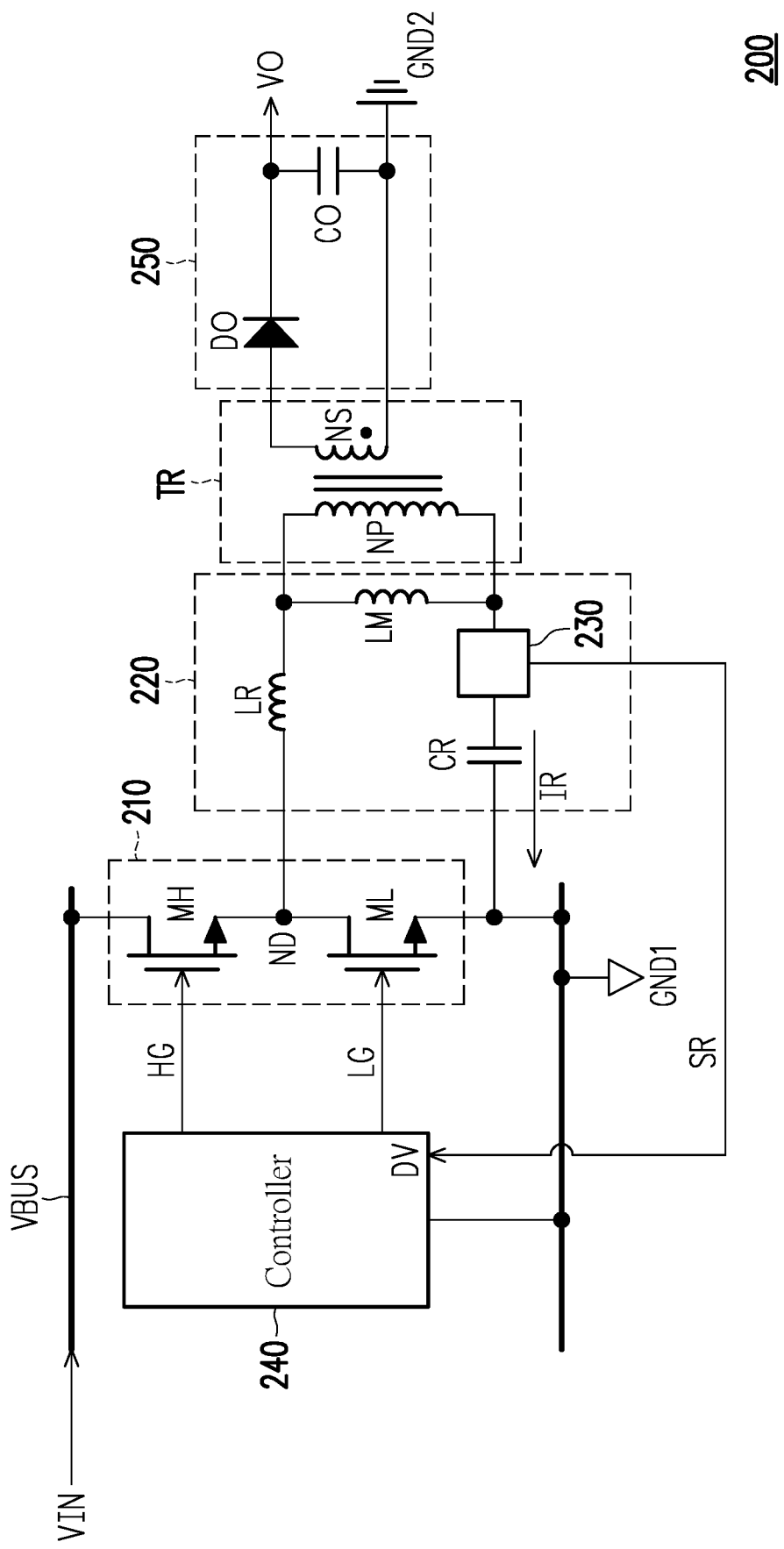
FIG. 3 is a schematic diagram of an AHB converter according to a second embodiment of the disclosure.

Referring to FIG. 3, FIG. 3 is a schematic diagram of an AHB converter according to a second embodiment of the disclosure. In the embodiment, an AHB converter 200 includes a switch circuit 210, a resonance tank 220, a current sensor 230, a controller 240, the transformer TR, and an output circuit 250. The current sensor 230 is coupled between the second end of the magnetizing inductor LM and the first end of the resonance capacitor CR. In the embodiment, the current sensor 230 may obtain the waveform of the resonance current IR in a manner of current sensing known by those skilled in the art. For example, the current sensor 230 includes a sensing resistor. The sensing resistor is coupled between the second end of the magnetizing inductor LM and the first end of the resonance capacitor CR. The sensing resistor provides a sensing voltage value based on the resonance current IR. The current sensor 230 may obtain the waveform of the resonance current IR according to a change in the sensing voltage value and a resistance value of the sensing resistor. In another example, the current sensor 230 includes a coupling inductor. A first inductor of the coupling inductor is coupled between the second end of the magnetizing inductor LM and the first end of the resonance capacitor CR. The first inductor receives resonance energy of the resonance current IR and couples the resonance energy to a second inductor of the coupling inductor in a manner of inductive coupling. The current sensor 230 may obtain the waveform of the resonance current IR according to a change in the energy on the second inductor.

For the implementation of the switch circuit 210, the resonance tank 220, the controller 240, the transformer TR, and the output circuit 250 of the embodiment, the embodiments of FIG. 1, FIG. 2A, and FIG. 2B may be referred to, and the relevant details are not repeated here.

Figure 4:
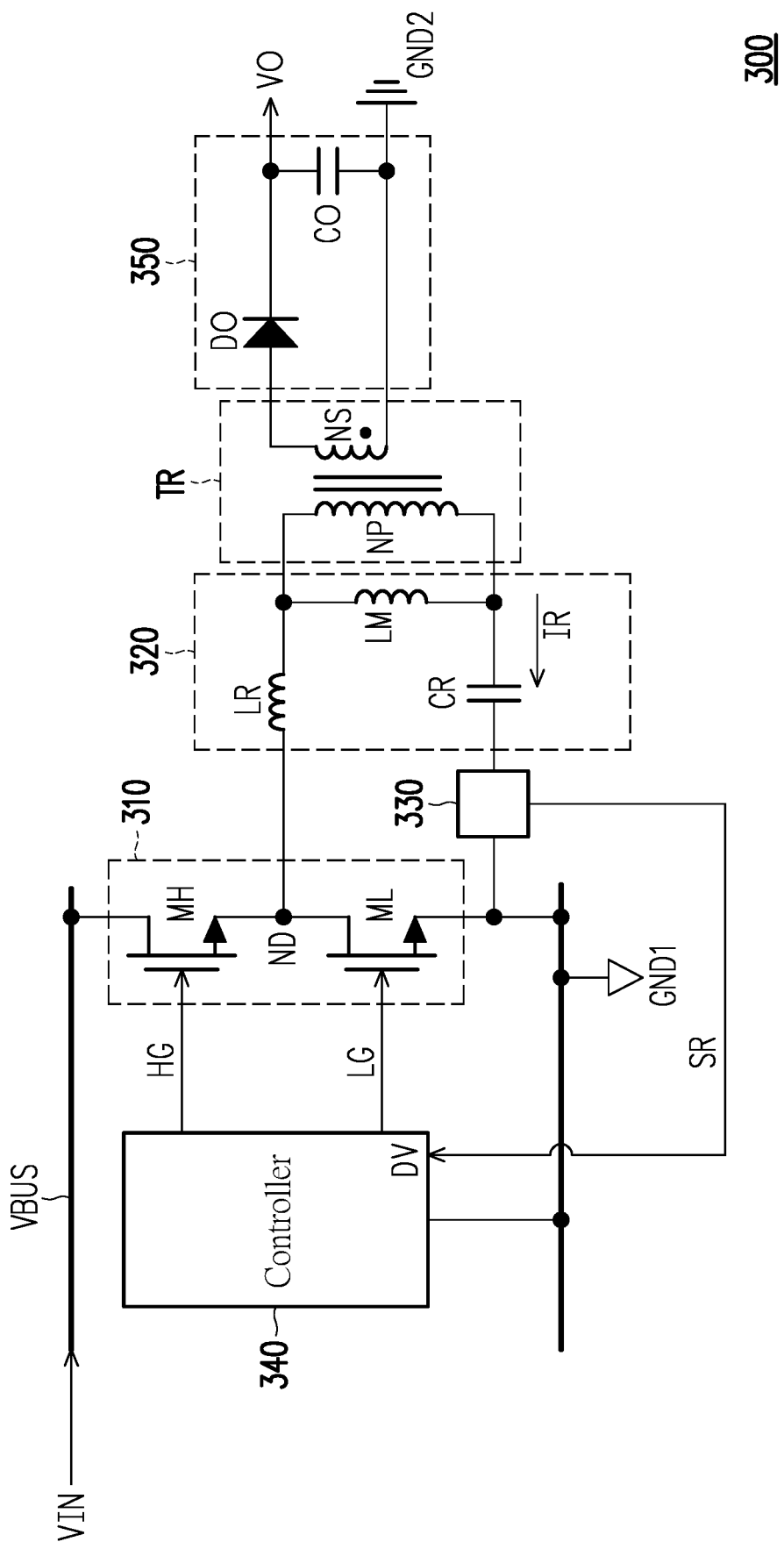
FIG. 4 is a schematic diagram of an AHB converter according to a third embodiment of the disclosure.

Referring to FIG. 4, FIG. 4 is a schematic diagram of an AHB converter according to a third embodiment of the disclosure. In the embodiment, an AHB converter 300 includes a switch circuit 310, a resonance tank 320, a current sensor 330, a controller 340, the transformer TR, and an output circuit 350. The current sensor 330 is coupled between the second end of the resonance capacitor CR and the ground end GND1. In the embodiment, the current sensor 330 may obtain the waveform of the resonance current IR in the manner of current sensing known by those skilled in the art. Specifically, the current sensor 330 is coupled between the second end of the resonance capacitor CR and the second end of the lower arm switch ML.

For the implementation of the switch circuit 310, the resonance tank 320, the controller 340, the transformer TR, and the output circuit 350 of the embodiment, the embodiments of FIG. 1, FIG. 2A, and FIG. 2B may be referred to, and the relevant details are not repeated here. The operation of the current sensor 330 may be sufficiently taught from the examples of the current sensor 230 of the second embodiment, and the relevant details are not repeated here.

Figure 5:
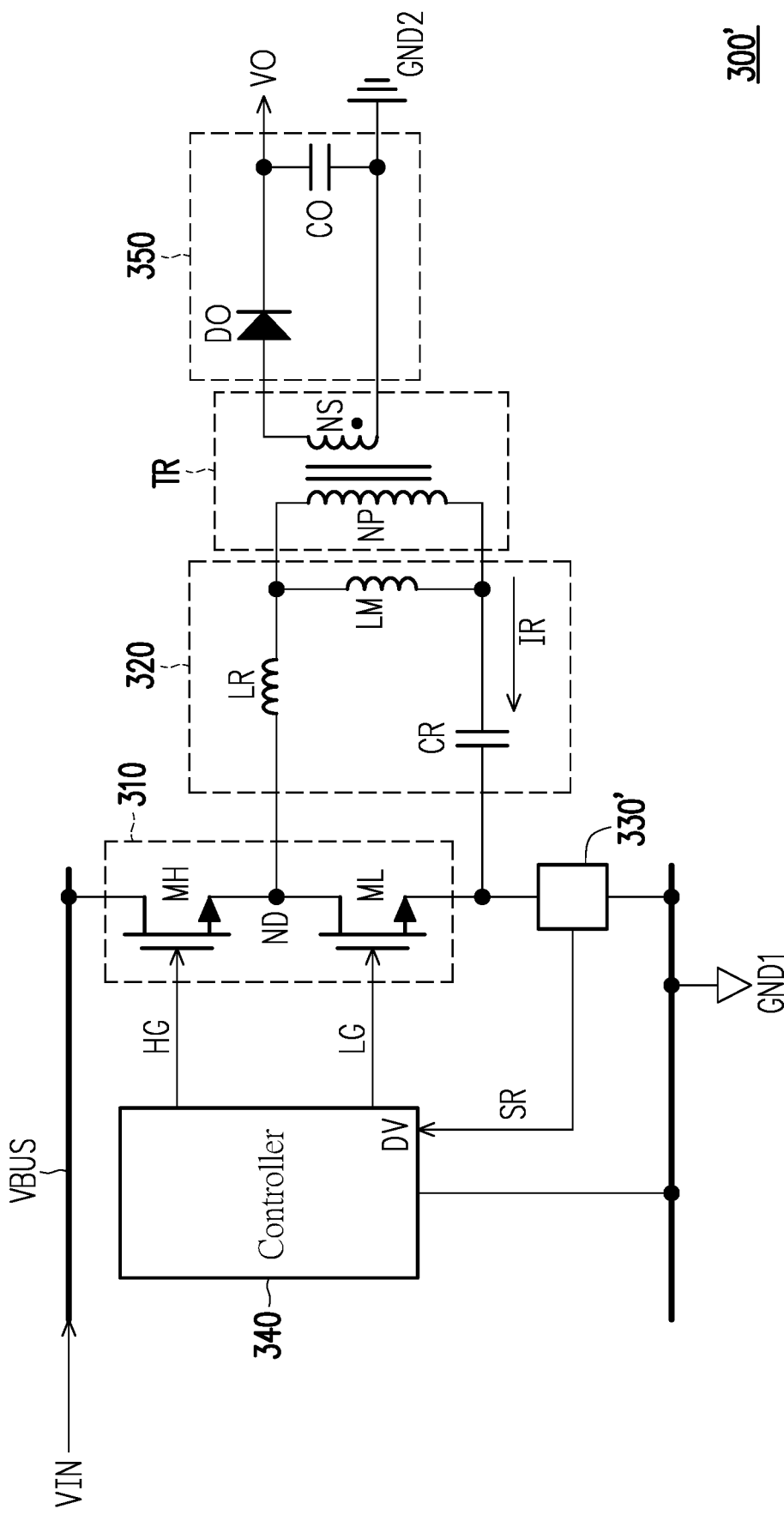
FIG. 5 is a schematic diagram of an AHB converter according to a fourth embodiment of the disclosure.

Referring to FIG. 5, FIG. 5 is a schematic diagram of an AHB converter according to a fourth embodiment of the disclosure. In the embodiment, an AHB converter 300' includes the switch circuit 310, the resonance tank 320, a current sensor 330', the controller 340, the transformer TR, and the output circuit 350. The difference between the embodiment and the embodiment of FIG. 4 is that the current sensor 330' is coupled between the second end of the lower arm switch ML and the ground end GND1.

Figure 6:
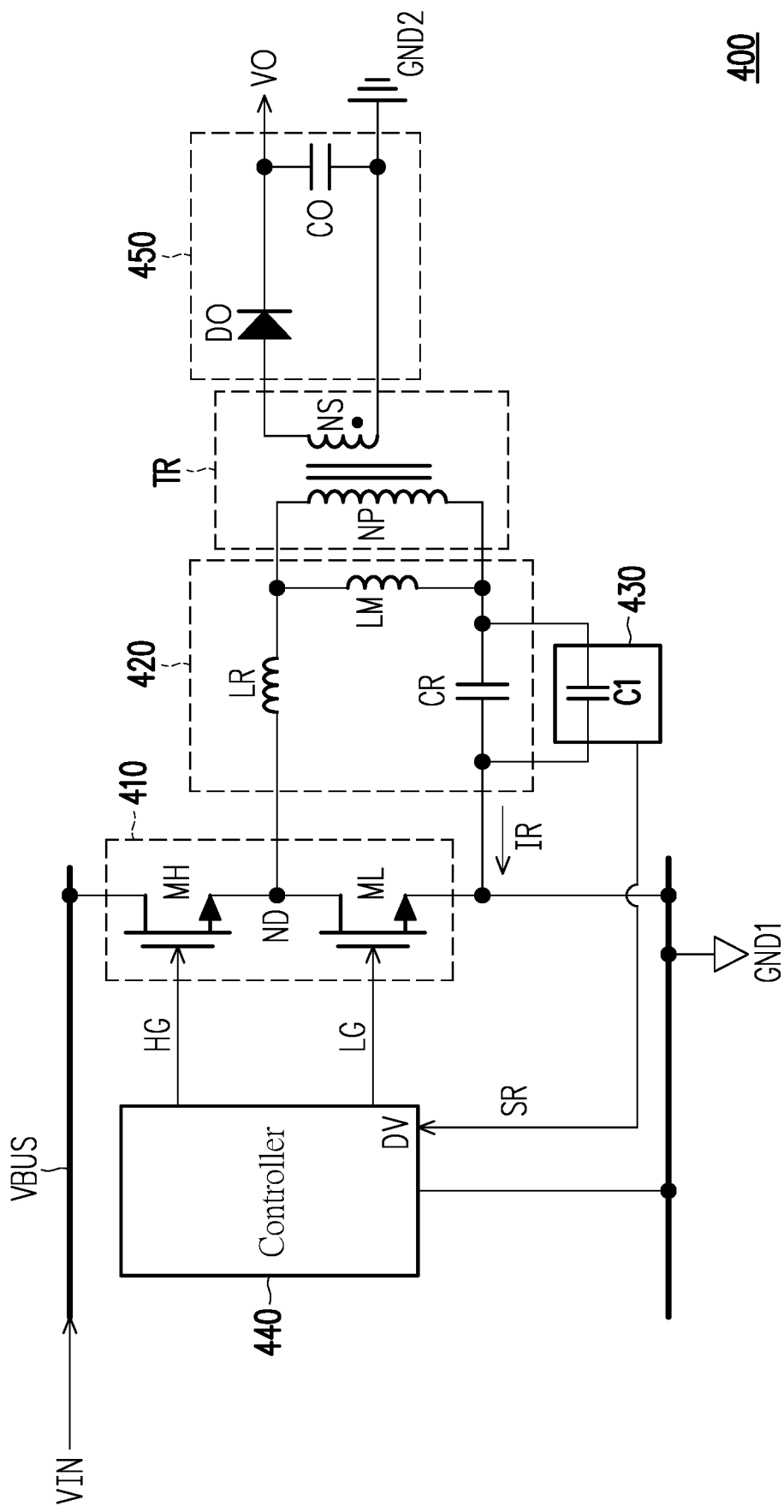
FIG. 6 is a schematic diagram of an AHB converter according to a fifth embodiment of the disclosure.

Referring to FIG. 6, FIG. 6 is a schematic diagram of an AHB converter according to a fifth embodiment of the disclosure. In the embodiment, an AHB converter 400 includes a switch circuit 410, a resonance tank 420, a current sensor 430, a controller 440, the transformer TR, and an output circuit 450. In the embodiment, the current sensor 430 and the resonance capacitor CR are coupled in parallel. For example, the current sensor 430 may include a capacitor C1. The capacitor C1 and the resonance capacitor CR are coupled in parallel. A first resonance current in the resonance current IR may flow through the resonance capacitor CR. A second resonance current in the resonance current IR may flow through the capacitor C1. There is a current value ratio of a current value of the first resonance current to a current value of the second resonance current. The current value ratio is associated with a capacitance value relationship of the resonance capacitor CR and the capacitor C1. Hence, the current sensor 430 may obtain the waveform of the resonance current IR according to a change in current value of the second resonance current and the capacitance value relationship of the resonance capacitor CR and the capacitor C1.

For the implementation of the switch circuit 410, the resonance tank 420, the controller 440, the transformer TR, and the output circuit 450 of the embodiment, the embodiments of FIG. 1, FIG. 2A, and FIG. 2B may be referred to, and the relevant details are not repeated here.

In summary of the above, the AHB converter of the disclosure includes the switch circuit, the resonance tank, the current sensor, and the controller. The current sensor senses the waveform of the resonance current flowing through the resonance tank to generate the sensing result. When the sensing result indicates that the ending current value when the primary resonance waveform of the resonance current ends is greater than the predetermined value, the controller performs the first switching operation on the switch circuit. When the sensing result indicates that the ending current value of the primary resonance waveform is less than or equal to the predetermined value, the controller performs the second switching operation on the switch circuit. As a result, the AHB converter may perform the switching operation corresponding to the waveform according to the waveform of the resonance current. In this way, the AHB converter may automatically and instantly adopt the corresponding suitable operation under the different load conditions.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An asymmetric half-bridge converter, comprising:
   a switch circuit comprising an upper arm switch and a lower arm switch, wherein the upper arm switch and the lower arm switch are connected to a connection node;
   a resonance tank coupled between the connection node and a ground end;
   a current sensor coupled to the resonance tank and configured to sense a waveform of a resonance current flowing through the resonance tank to generate a sensing result, wherein the waveform of the resonance current responds to a load condition; and
   a controller coupled to the resonance tank and the switch circuit and configured to:
      determine the sensing result,
      in response to the sensing result indicating that an ending current value of a primary resonance waveform of the resonance current is greater than a predetermined value, perform a first switching operation on the switch circuit,
      and in response to the sensing result indicating that the ending current value of the primary resonance waveform is less than or equal to the predetermined value, perform a second switching operation on the switch circuit.

2. The asymmetric half-bridge converter according to claim 1, wherein:
   the controller performs the first switching operation on the switch circuit so that the asymmetric half-bridge converter is applied in a light load state, and
   the controller performs the second switching operation on the switch circuit so that the asymmetric half-bridge converter is applied in a heavy load state.

3. The asymmetric half-bridge converter according to claim 1, wherein:
   the primary resonance waveform is a first resonance undulation in a period when the lower arm switch is turned on, and
   the primary resonance waveform ends at the ending current value.

4. The asymmetric half-bridge converter according to claim 1, wherein, in response to the sensing result indicating that a first decreasing negative slope appears on the resonance current and a positive slope subsequently appears, it is determined that the primary resonance waveform of the resonance current appears.

5. The asymmetric half-bridge converter according to claim 4, wherein a current value in response to the positive slope turning into a negative slope is the ending current value.

6. The asymmetric half-bridge converter according to claim 1, wherein:
   in the first switching operation, the controller controls a current value of the resonance current to be approximately 0 at a first time point when the lower arm switch is turned off and turns on the upper arm switch at a second time point, and
   the second time point is behind the first time point by a predetermined length of time.

7. The asymmetric half-bridge converter according to claim 1, wherein, in response to the sensing result indicating that after the primary resonance waveform of the resonance current ends, a secondary resonance waveform appears, the controller performs the first switching operation on the switch circuit.

8. The asymmetric half-bridge converter according to claim 1, wherein, in the second switching operation, the controller controls a current value of the resonance current to be a negative current value at a time point when the lower arm switch is turned off and instantly turns on the upper arm switch at the time point when the lower arm switch is turned off.

9. The asymmetric half-bridge converter according to claim 1, wherein the resonance tank comprises:
   a resonance inductor, wherein a first end of the resonance inductor is coupled to the connection node;
   a magnetizing inductor, wherein a first end of the magnetizing inductor is coupled to a second end of the resonance inductor; and
   a resonance capacitor, wherein a first end of the resonance capacitor is coupled to a second end of the magnetizing inductor, and a second end of the resonance capacitor is coupled to the ground end.

10. The asymmetric half-bridge converter according to claim 9, wherein the current sensor is coupled between the second end of the magnetizing inductor and the first end of the resonance capacitor.

11. The asymmetric half-bridge converter according to claim 9, wherein the current sensor is coupled between the second end of the resonance capacitor and the ground end.

12. The asymmetric half-bridge converter according to claim 9, wherein the current sensor and the resonance capacitor are coupled in parallel.

* * * * *